Sept. 30, 1969 C. W. CANNON 3,469,648
HYDRAULIC MOTOR DRIVEN STEERABLE WHEEL
Filed May 15, 1967 2 Sheets-Sheet 2

United States Patent Office 3,469,648
Patented Sept. 30, 1969

3,469,648
HYDRAULIC MOTOR DRIVEN
STEERABLE WHEEL
Craig W. Cannon, New Berlin, Wis., assignor to Allis-Chalmers Manufacturing Company, Milwaukee, Wis.
Filed May 15, 1967, Ser. No. 638,404
Int. Cl. B60k 1/00, 3/00, 17/30
U.S. Cl. 180—43                           4 Claims

ABSTRACT OF THE DISCLOSURE

A vehicle wheel drive having a coincidental kingpin axis and power transmitting axis. The wheel means is pivotally connected to the front axle on an axis coincidental with the rotating axis of the drive pinion which drives the wheel.

---

This invention relates to a vehicle suspension and drive means and more particularly to a power transmission driving through an axis coincidental with the kingpin axis.

The conventional cargo carrying or cargo pulling vehicle employs an internal combustion engine driving through a transmission and a standard rear wheel drive. This conventional drive system is satisfactory under most circumstances. The mechanically operated four wheel drive system for vehicles has been used to provide greater traction, but does have the disadvantage of the bulkiness of the axle differential and universal joints plus the inherent roughness and bucking of operation. A more recent trend has been developed whereby a hydraulic system is used to provide a drive means for the vehicle front wheels. Of the hydraulic systems used, the hydrostatic system which uses a power driven pump connected to hydraulic motors by hydraulic lines is a versatile and functional type of system. This type of system provides smooth power and eliminates bucking inherent in the mechanical system and provides for a front wheel assist in combination with the conventional rear wheel drive.

The front wheel assist utilizing a hydraulic motor mounted adjacent the front wheel or the steerable wheel of the vehicle requires swivel fittings to connect the motor to the transmission lines when the motor is connected in the front wheel assembly. The swivel fitting forms a weakness in the hydraulic system which generally fails before the other components of the hydraulic system. The high pressure transmission lines are inflexible when a high pressure fluid is contained within the transmission lines. Accordingly, this invention provides a means wherein swivel fittings may be eliminated from the transmission lines. The motor is mounted on the vehicle body or front axle and a mechanical power transmission connected intermediate the motor and the front wheel, drives through a rotating element coincidental with the pivotal axis of the front wheel. This type of a system provides all the advantages of the front wheel assist using high pressure fluids in the transmission lines to provide a durable, long life, trouble free hydraulic system.

It is an object of this invention to provide a vehicle drive means for driving a steerable vehicle wheel.

It is another object of this invention to provide a vehicle drive means driving a steerable vehicle wheel in which the power is transmitted through a driving element coincidental with and turning on an axis coincidental with the pivoting axis of the vehicle wheel.

It is a further object of this invention to provide a vehicle drive means driving a steerable vehicle wheel driving through a power transmitting element coincidental with the kingpin axis of the steerable wheel.

The objects of this invention are accomplished by providing a hydraulic motor which is mounted on the front axle of the vehicle. The wheel assembly is pivotally connected to the front axle and pivots about a steerable axis. A transmission is connected intermediate the motor and the wheel and drives through an element rotating on an axis coincidental with the steerable axis of the vehicle wheel. Accordingly, the swivel fittings normally used to connect the hydraulic motor may be eliminated which provides a more durable, longer lasting hydraulic system.

The preferred embodiments of this invention will be described in the following paragraphs and illustrated in the attached drawings.

Figure 1:
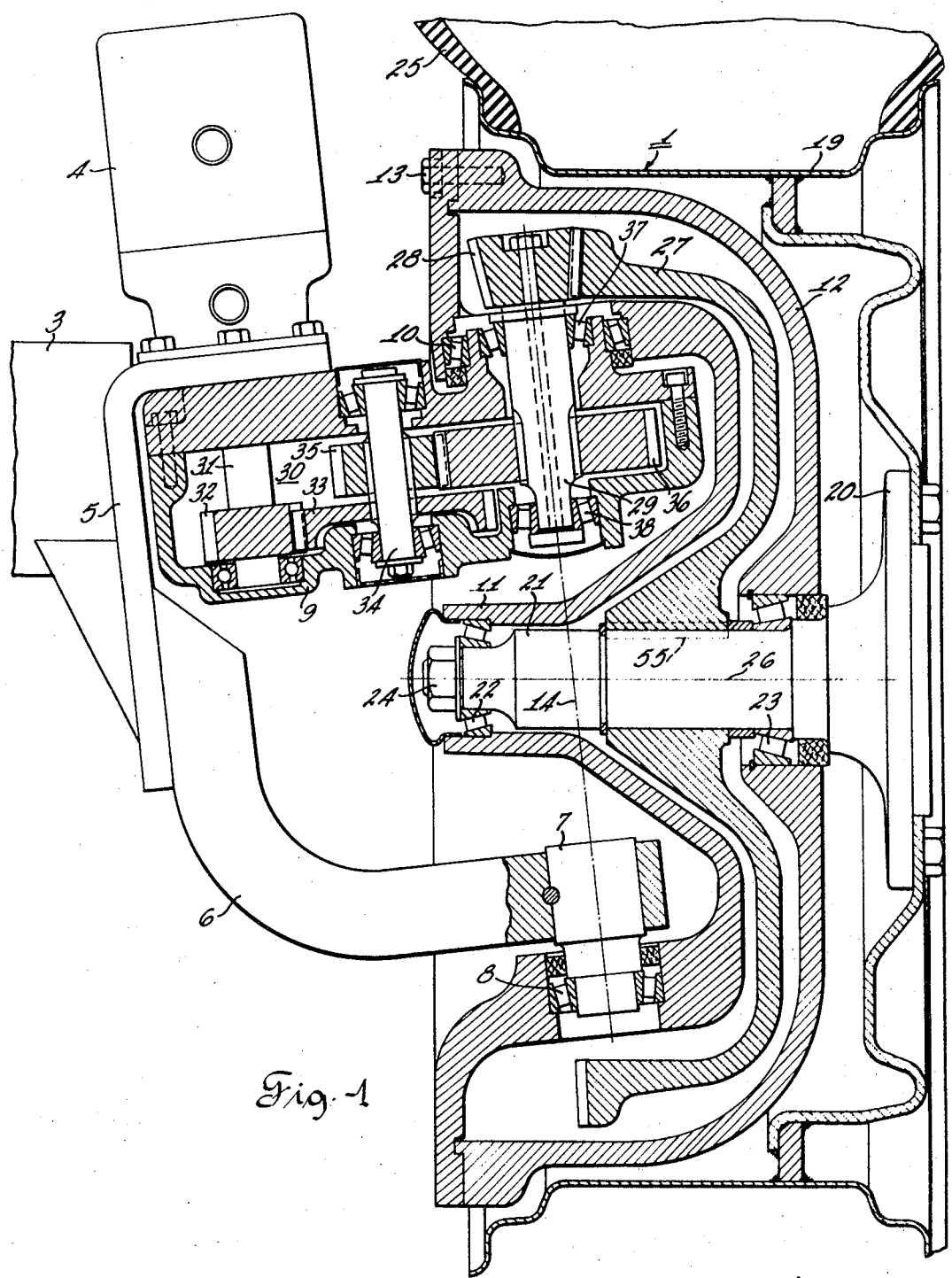
FIG. 1 illustrates a cross section view of the vehicle drive unit and the steering mechanism.
Figure 2:
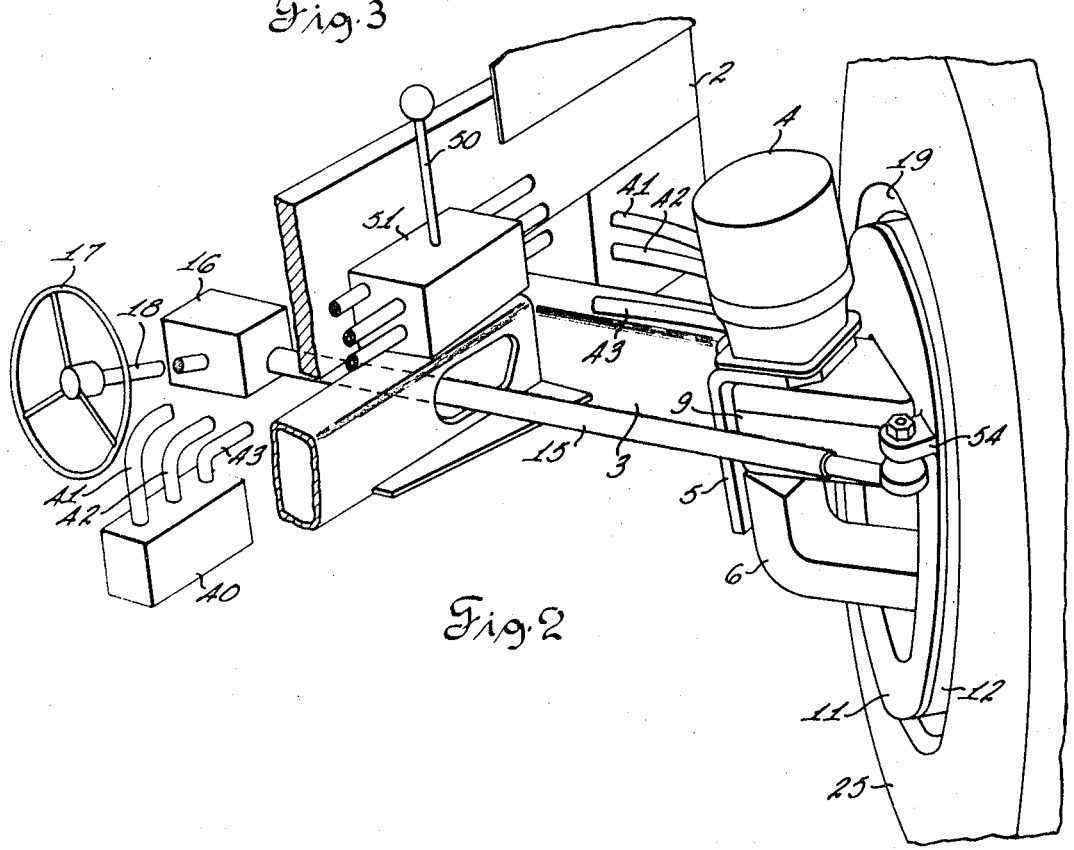
FIG. 2 illustrates a limited rear view with portions schematically shown of the steering mechanism and vehicle suspension in connection with the right-hand vehicle wheel.

Referring to the drawings, FIG. 1 and FIG. 2 generally illustrate a drive wheel 1 generally supporting a vehicle body 2 by means of the axle 3. The axle 3 as shown can rock or tilt within limits about a longitudinal axis centrally located with respect to the vehicle body. The drive motor 4 is fastened on the front axle 3. The cross section view shown in FIG. 1 is of the right-hand vehicle wheel and only a single wheel and motor is illustrated as the left-hand vehicle wheel and motor will be identical with the view shown. The motor 4 is fastened on a bracket 5 which is integral with the axle 3. An arm 6 extends downwardly and is integrally connected to a stub shaft 7 which forms a journal received within the bearing assembly 8.

The bracket 5 is also connected to the transmission housing 9 which supports the bearing assembly 10 forming the other end of the pivoting structure defining a pivotal steering axis 14 for the wheel assembly. The wheel assembly includes an inner spindle support 11 and outer spindle support 12 which are fastened together by a plurality of bolts 13. The inner spindle support 11 has an annular opening which receives the bearing assembly 10 on its upper portion and also a second annular opening on its lower portion to receive the bearing assembly 8. The axis 14 of the bearing assemblies 8 and 10 define a pivotal steering axis of the spindle supports 11 and 12 as well as the wheel assembly. The spindle supports are connected to the steering arm 54 which in turn is pivotally connected to the tie rod 15 for steering the vehicle wheel. The tie rod 15 extends transversely relative to the vehicle body to the steering mechanism 16 which is steered manually by the steering wheel 17 through steering column 18.

The wheel rim 19 is fastened to a radial flange 20 on the spindle 21. The spindle 21 is rotatably mounted on the inner bearing assembly 22 and the outer bearing assembly 23. The spindle is fastened within these bearing assemblies by means of a nut 24. A tire 25 is seated within the rim 19 of the vehicle wheel.

The vehicle wheel 1 rotates about the axis 26. The spindle 21 is fastened by means of a key 55 to the ring gear 27. The ring gear 27 meshes with the bevel pinion gear 28 which is connected to the stub shaft 29 extending into the transmission 30.

The motor 4 is fastened to the axle 3 and the rotor of the motor is fastened to the drive shaft 31 which is connected to the drive gear 32. The drive gear 32 drives through the gear chain of gears 33, shaft 34, and gears 35 and 36. The gear 36 is connected by a spline to the stub shaft 29. The gears and shafts in the transmission are suitably mounted in bearing supports contained in the transmission housing to provide a driving transmission of power from the motor 4 to the ring gear 27. The stub shaft 29 is mounted on the bearing assemblies 37 and 38 which are supported in the transmission housing 9. The axis of rotation of the stub shaft 29 defines the driving axis for power transmission from the transmission 30 to the ring gear 27 and is coincidental with the pivotal axis 14 of the wheel assembly when the vehicle wheel is steered.

The motor 4 is offset from the kingpin axis or pivotal axis 14 to conserve space in the wheel assembly. The motor 4 could be mounted at any point transversely on the axle or on the kingpin axis if so desired. The requirement is to provide the proper speed and torque of the vehicle wheel and for the desired ground speed of the vehicle.

Referring to FIG. 2 the vehicle suspension and steering means is shown in a rear three dimensional view to more clearly illustrate its relationship relative to the vehicle body. The motor 4 is shown mounted on the axle 3 which drives through the transmission shown in FIG. 1 to rotate the vehicle wheel. A steering mechanism is also shown to steer the vehicle wheel about the axis 14 as illustrated and described in FIG. 1. The hydraulic motor is connected to the hydraulic pump 40 by means of three conduits 41, 42 and 43. The hydraulic pump 40 is driven by a suitable connection to the internal combustion engine, not shown. A high pressure hydraulic fluid is transmitted through the hydraulic lines to transmit power from the pump 40 to the motor 4.

The vehicle body 2 is pivotally supported on the vehicle axle 3 which rocks and tilts on a central axis as in conventional design.

Figure 3:
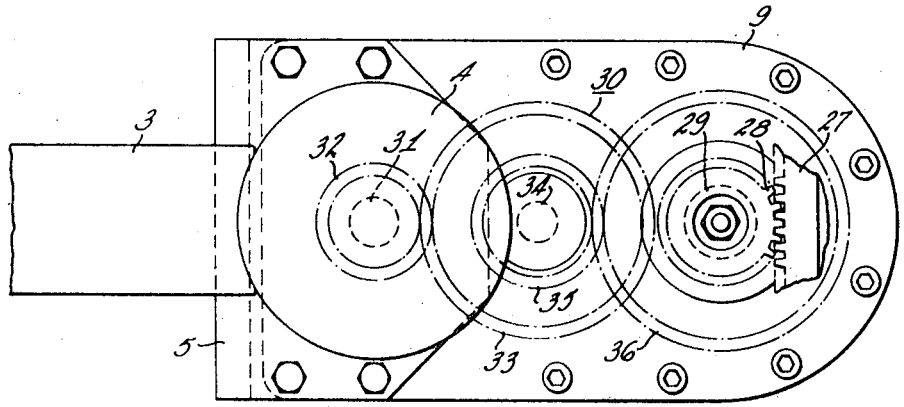
FIG. 3 illustrates a plan view of the drive mechanism on the front axis of the vehicle wheel.

Referring to FIG. 3 the top view of the motor mount and the front axis is shown. The motor 4 drives through the transmission 30 to drive the ring gear 27 which is fastened to the spindle 21 which is connected to vehicle wheel 1. A preferred embodiment of this invention has been illustrated and described. The following description sets forth the operation of the mechanism.

The motor 4 is fastened to the front axle 3 and is driven in response to a control lever 50 in the control valve 51. The motor may be driven forward or rearwardly in response to operation of the lever 50.

The motor being fastened to the front axle of the vehicle requires no swivel fittings in its hydraulic conduits 41, 42 and 43 between the pump 40 and the motor 4.

The motor 4 drives through the transmission having a shaft 29 rotating about an axis 14 which is coincidental with the pivotal steering axis defined by the bearings 10 and 8. Accordingly, any transmission of power from the motor 4 through the transmission 30 is through the common axis 14. The vehicle wheel may be driven forwardly or rearwardly in response to actuation of the control valve 50 in the hydraulic system. Any desired speed ratio may be built into the hydraulic transmission and motor to control the torque and rate of travel of the vehicle wheel. The hydraulic transmission as provided by the fluid conduits between the pump 40 and the motor 4 provide smooth, even transmission of power to all wheels and synchronizes the rate of speed of all the wheels. More than one gear ratio may be built into the mechanical transmission for transmitting power from the motor 4 to the vehicle wheel 1.

The embodiments of the invention in which an exclusive property or privilege is claimed are defined as follows:

1. A vehicle wheel drive and steering mechanism comprising, a vehicle body means including an axle, a steerable wheel means having a spindle support and including wheel and spindle shaft secured thereto and rotatably mounted in said spindle support, a ring gear fixed to said spindle shaft, said spindle support positioned within said wheel, means pivotally connecting said wheel means on said axle means and defining a pivotal kingpin axis, a transmission including a stub shaft disposed within the confines of the wheel and carrying a motor driven gear and a drive pinion extending radially outward from said spindle shaft for driving said ring gear and wheel and defining a rotatable drive axis coincidental with the pivotal kingpin axis of said steerable wheel means, a motor supported on said axle drivingly connected to said driven gear for driving said ring gear and wheel, steering means on said body means connected to said wheel means to pivotally steer said wheel means about the pivotal kingpin axis to thereby provide a common steering and drive axis for said vehicle wheel means and said wheel respectively.

2. A vehicle wheel drive and steering mechanism as set forth in claim 1 wherein said transmission includes a plurality of gears.

3. A vehicle wheel drive and steering mechanism as set forth in claim 1 wherein said motor is a hydrostatic motor driven by high pressure fluid in transmission lines from a pump on said vehicle body means.

4. A vehicle wheel drive and steering mechanism as set forth in claim 1 wherein said motor drives in either direction in response to a control means in the hydraulic fluid system.

References Cited

UNITED STATES PATENTS 1,840,407   1/1932   Norman.
2,939,344   6/1960   Harris.

A. HARRY LEVY, Primary Examiner

U.S. Cl. X.R.

180—55, 66